June 8, 1948.　　　　　E. D. DRAKE　　　　　2,442,921
REFRIGERATOR CABINET
Filed April 19, 1944　　　　　　　　　　　　2 Sheets-Sheet 1

INVENTOR.
EARL D. DRAKE
BY
Carroll R. Taber
ATTY.

June 8, 1948. E. D. DRAKE 2,442,921
REFRIGERATOR CABINET
Filed April 19, 1944 2 Sheets-Sheet 2
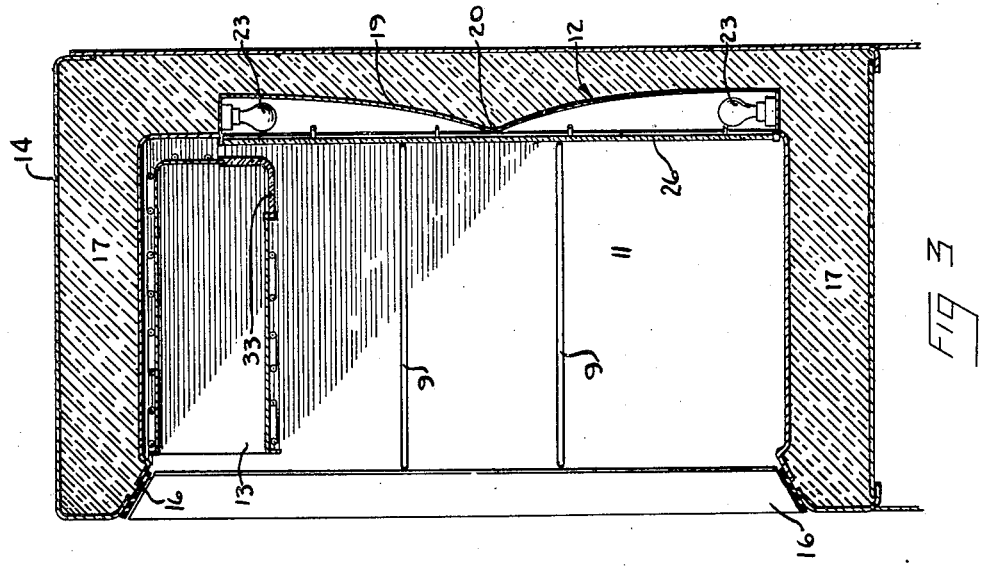
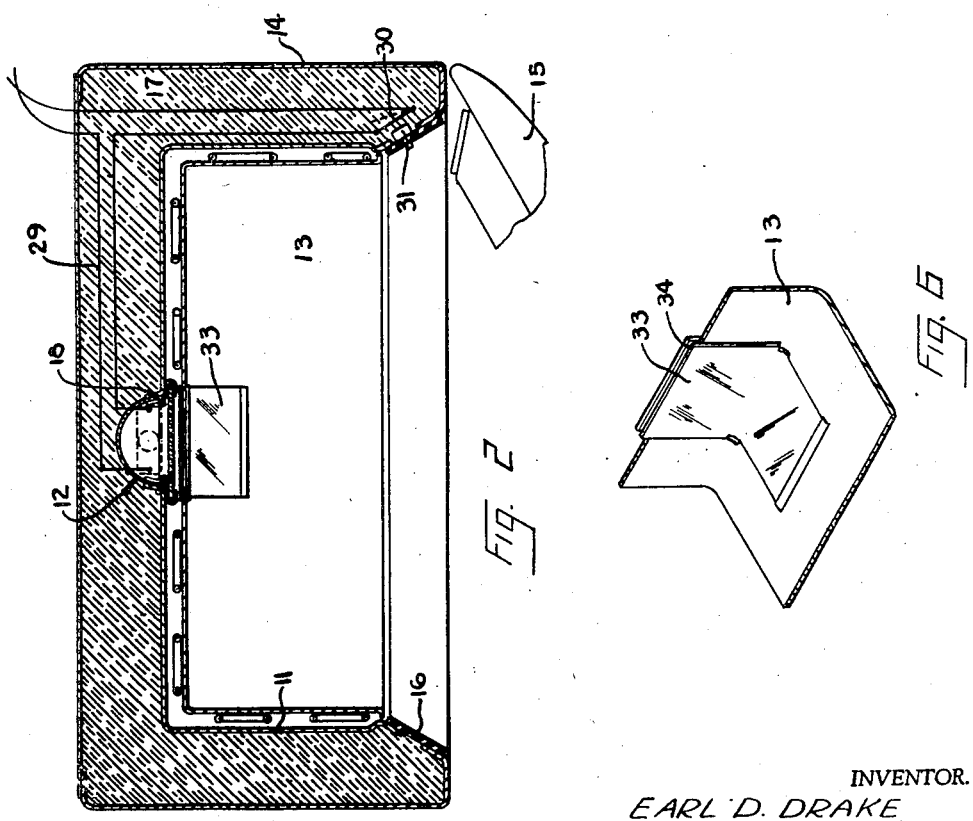
INVENTOR.
EARL D. DRAKE
BY
Carroll R. Taber
ATTY.

Patented June 8, 1948

2,442,921

UNITED STATES PATENT OFFICE 2,442,921

REFRIGERATOR CABINET

Earl D. Drake, Greenville, Mich., assignor to Gibson Refrigerator Company, Greenville, Mich., a corporation of Michigan Application April 19, 1944, Serial No. 531,752

3 Claims. (Cl. 240—4)

This invention relates to refrigerator cabinets and more particularly to means for illuminating the interior thereof.

Heretofore it has been the practice to illuminate the food storage chamber of household refrigerators by means of light bulbs mounted on or near the top wall of the liner. While such lights are effective when little or no food is stored in the storage chamber, they lose much of their effectiveness when the food supporting shelves are loaded with food. The dishes and jars of food block the light and prevent it from reaching the compartments below the top compartment. Furthermore, a bare light bulb in the chamber is not particularly attractive to the eye, it takes up some space in the chamber, and it radiates appreciable quantities of heat when it is burning.

The present invention has been designed to provide a lighting means for a refrigerator food storage chamber which is attractive in appearance; utilizes no space within the chamber; illuminates substantially uniformly the variously compartments within the refrigerator regardless of the number of containers placed in the chamber; and uses a minimum of light bulbs.

The principal object of the present invention is to provide a refrigerator cabinet having a food storage chamber and provided with novel means for illuminating substantially the entire interior of the storage chamber.

Another object of the invention is to provide a lighting arrangement for the food storage chamber which is located exteriorly of the chamber.

A still further object is to provide a source of illumination for a food storage chamber of a refrigerator which is arranged to form an elongated pillar or column of light.

Another object is to provide a single means for illuminating the interior of the storage chamber as well as the inner enclosure which is constructed to admit light thereto from the illuminating means.

A still further object is to provide a refrigerator cabinet separated into a plurality of compartments and means for illuminating more than one of said compartments from a single source of light.

Another object is to provide a novel lighting fixture and means for attaching the lighting fixture to the refrigerator liner.

These objects will more fully appear in the following specification, when read in connection with the accompanying drawings, wherein:

Figure 2 is a cross-sectional view taken on substantially the line 2—2 of Figure 1;

Figure 3 is a cross-sectional view taken on substantially the line 3—3 of Figure 1;

Figure 6 is a pictorial view of a portion of the evaporator for cooling the food storage chamber.

Figures 1, 5:
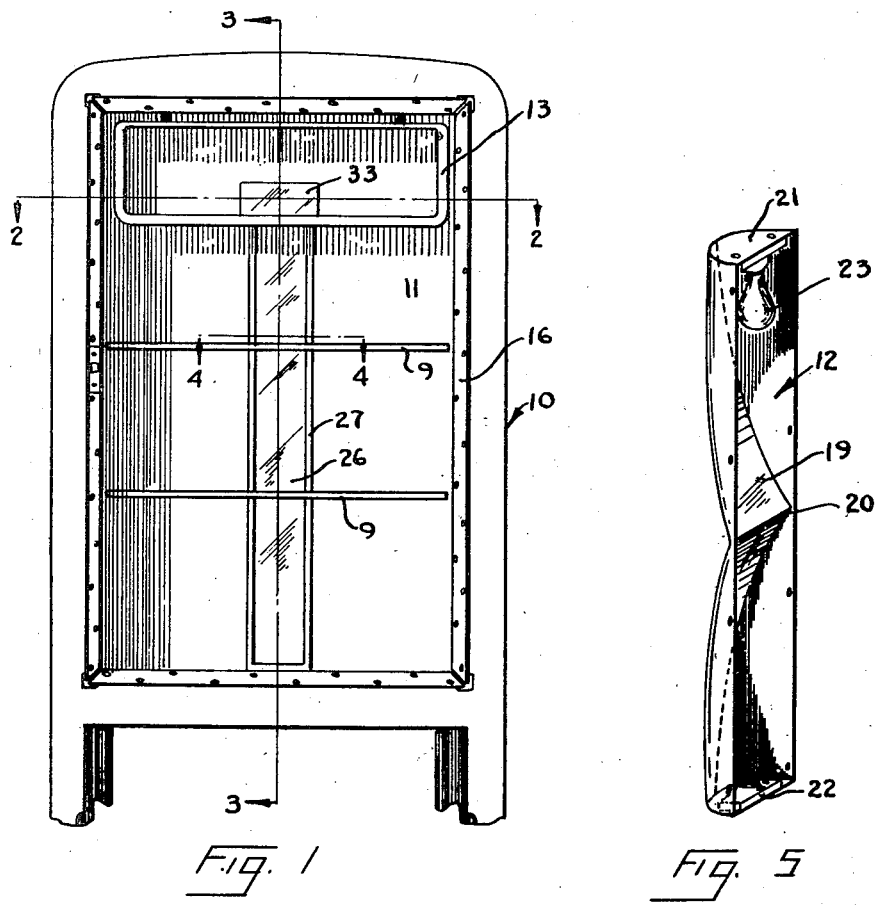
Figure 1 is a fragmentary front elevational view of a refrigerator cabinet embodying the invention with the door of the cabinet removed.
Figure 5 is a pictorial view of the illuminating means for the interior of the food storage chamber of the refrigerator.

In its broadest aspects the invention comprises a refrigerator cabinet 10 having a liner 11 therein defining a food storage chamber divided into compartments by shelves 9, the liner having a portion constructed to admit light thereto, a lighting fixture 12 located in the space between the outer shell of the cabinet and the liner, and an evaporator 13 having a portion constructed to admit light from the lighting fixture to the evaporator. The lighting fixture 12 is constructed and arranged so that light is distributed substantially uniformly throughout the various compartments within the interior of the liner.

Referring now more in detail to the drawings, the refrigerator cabinet 10 comprises an outer shell 14, which may be of any conventional construction, having a door opening in the front thereof. The door opening is defined by breaker strips of insulating material 16. Within the outer shell 14 and spaced therefrom is the liner 11. Liner 11 is of generally box-shaped configuration having an access opening at the front thereof. The portion of the liner forming the perimeter of the access opening is connected to the outer shell by means of the aforesaid breaker strips 16. Insulation 17 of any suitable character is installed between the inner and outer shell to reduce heat transference to a minimum.

In the rear upright wall of the liner 11 is a vertically elongated opening, the upright edges of which are defined by rearwardly extending flanges 18. This opening is adapted to admit light from the lighting fixture 12 which is mounted in the opening, as will be more fully described presently.

At vertically spaced intervals within the liner are shelves 9. The shelves may be imperforate so as to divide the liner into a plurality of compartments. The shelves may be of any suitable construction. They may be perforate or imperforate. They may be made of light transmitting material, such as glass, or they may be opaque, if desired.

The lighting fixture 12 is shown best in Figure 5. It comprises a reflector which may be formed of sheet metal plated and polished on its interior surface. The reflector extends the full vertical height of the opening in the liner and substantially the full vertical height of the liner. The reflector is of generally semi-cylindrical configuration at its top and bottom ends and is provided with a back wall 19 which curves toward a ridge 20 midway between the upper and lower ends. The top and bottom ends of the reflector are closed by semi-circular plates 21 on which lamp sockets 22 are mounted. The lamp sockets 22 are adapted to receive conventional lamp bulbs 23.

The reflector is mounted in the opening in the back wall of the liner by means of screws 24 which attach it to the flanges 18. The screws 24 are also employed to attach a plurality of resilient attaching clips 25 of the cross-section shown in Figure 4. The inner ends of the clips 25 are hook shaped, as shown, for a purpose which will presently appear.

Figure 4:
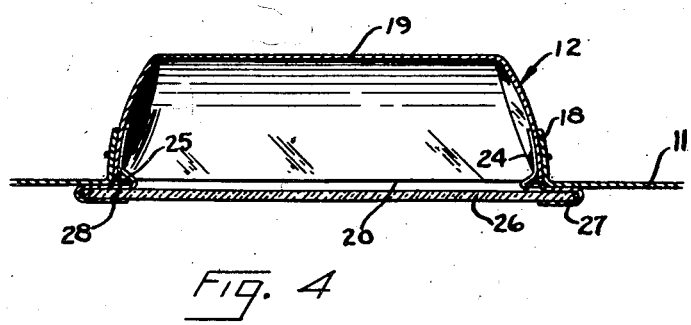
Figure 4 is a fragmentary cross-sectional view taken on substantially the line 4—4 of Figure 1.

In order to aid in diffusing the light within the food storage chamber, as well as to reduce heat transference from the lamp bulbs 23 to the interior of the cabinet, the opening in the rear wall of the liner is covered by a plate 26 of light transmitting material, such as glass or plastic. The plate 26 may be frosted, i. e., translucent. The plate 26 is surrounded by a channel-shaped frame 27 of metal or plastic material. The extreme edge of the leg 28 of the channel adjacent the rear wall of the liner is spaced from the plane of the plate, as illustrated in Figure 4. Legs 28 are received in the hook shaped portions of the clips 25, as shown in Figure 4, in order to detachably hold the plate 26 in proper relationship to the liner wall.

The lamps 23 are connected by conductors 29 to a source of electric current and the circuit for the lights includes a switch 30 diagrammatically illustrated in Figure 2. The switch 30 may be of any suitable spring actuated type. The switch is adapted to be opened in order to break the lighting circuit by means of a button 31 mounted in the breaker strip 16 adjacent the hinge side of the refrigerator door. The button is adapted to be engaged by the door 15 when the latter is closed, so as to break the lighting circuit, and released when the door is opened so that the lamps will be lit. Such lighting switches are conventional and form no part of the present invention.

The evaporator 13 may be of any conventional construction. It comprises a housing open at the front end only and extending substantially the full width of the food storage chamber. Midway between the ends of the lower rear corner of the evaporator is an opening which extends a substantial distance into both the bottom wall and the rear wall of the evaporator. Circulation of air through the opening is prevented by means of a light transmitting plate 33. This plate may be of glass or plastic material. Preferably the edges are grooved to form a channel 34 which receives the walls of the evaporator about the perimeter of the opening.

As will be evident from Figure 3 particularly, the plate 33 in the evaporator is located not higher than the level of the upper lamp 23 in the lighting fixture and adjacent thereto so that rays of light from the lamp will illuminate the interior of the evaporator.

Due to the particular construction above described, the entire interior of the liner will be substantially uniformly illuminated when the lamps 23 are lighted. Only two sources of light are necessary, because the reflector and the frosted plate diffuse the light and form what is in effect a vertical column of light extending substantially the full length of the liner. Furthermore, due to the provision of the light transmitting section 33 of the evaporator, the latter will be illuminated also when the lamps are on.

While the shelves 9 are herein shown and described as being of imperforate glass or plastic material, it will be recognized that the advantages of the present invention may also be fully realized in a construction wherein the food compartments are separated from each other by perforate or imperforate shelves composed of other materials.

The scope of the invention is indicated in the appended claims.

I claim:

1. A refrigerator comprising a liner defining a food storage chamber, said liner having an access opening at the front thereof and a back wall opposite said opening, means in said chamber dividing the latter into a plurality of vertically superimposed compartments, and means associated with said back wall for illuminating the interior of certain of said compartments independently of each other, said means comprising a vertically elongated reflector attached to said back wall exteriorly thereof and having portions thereof positioned on opposite sides of the dividing means between two adjacent compartments, and a source of light mounted adjacent one vertical extremity of said reflector, said liner having a light transmitting window between said reflector and the interior of said chamber.

2. A refrigerator as defined in claim 1 wherein said light transmitting window is removably mounted in engagement with the remainder of said liner by means of clips secured to said reflector and having snap engagement with said window.

3. A refrigerator comprising a liner defining a food storage chamber, said liner having a vertically elongated opening in a wall thereof, said opening being defined by laterally outwardly extending flanges, a reflector located exteriorly of said liner and attached to said flanges, a plurality of clip members secured to said flanges, a light transmitting window having a perimetral frame provided with means cooperating with said clips to detachably connect said window to said liner, and a source of light within said reflector.

EARL D. DRAKE.

REFERENCES CITED

The following references are of record in the file of this patent:

UNITED STATES PATENTS

| Number | Name | Date |
|---|---|---|
| 1,874,245 | Corrigan | Aug. 30, 1932 |
| 1,931,343 | Cook et al. | Oct. 17, 1933 |
| 2,010,799 | Sexton | Aug. 6, 1935 |
| 2,112,147 | Downer | Mar. 22, 1938 |
| 2,122,293 | Pleasant et al. | June 28, 1938 |
| 2,135,878 | Sekyra | Nov. 8, 1938 |
| 2,148,778 | Seeger | Feb. 28, 1939 |
| 2,148,787 | Thomas | Feb. 28, 1939 |
| 2,153,851 | Swedman | Apr. 11, 1939 |
| 2,158,877 | Limpert et al. | May 16, 1939 |
| 2,209,869 | Yoxsimer | July 30, 1940 |
| 2,225,932 | Shaw | Dec. 24, 1940 |